US009755777B2

(12) United States Patent
Bato et al.

(10) Patent No.: US 9,755,777 B2
(45) Date of Patent: Sep. 5, 2017

(54) OPTICAL TRANSMITTER AND OPTICAL TRANSMISSION METHOD

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Koji Bato, Fukuoka (JP); Tomoyuki Sakata, Fukuoka (JP); Tatsuro Kishida, Fukuoka (JP); Koji Matsunaga, Munakata (JP); Tatsuya Toyozumi, Onojo (JP); Yuichiro Sakane, Fukuoka (JP); Wataru Kawasaki, Kanagawa (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 14/749,013

(22) Filed: Jun. 24, 2015

(65) Prior Publication Data
US 2016/0020866 A1 Jan. 21, 2016

(30) Foreign Application Priority Data
Jul. 16, 2014 (JP) .................................. 2014-146273

(51) Int. Cl.
*H04B 10/29* (2013.01)
*H04J 14/02* (2006.01)
(Continued)

(52) U.S. Cl.
CPC ........ *H04J 14/0221* (2013.01); *H04B 10/296* (2013.01); *H04J 14/06* (2013.01);
(Continued)

(58) Field of Classification Search
CPC .. H04J 14/0221; H04J 14/06; H04Q 11/0066; H04Q 11/0005; H04Q 2011/0016; H04Q 2011/0083; H04B 10/296
(Continued)

(56) References Cited

U.S. PATENT DOCUMENTS 5,589,975 A * 12/1996 Nakamura ............ H01S 3/1301
359/341.43
5,740,288 A * 4/1998 Pan ...................... G02B 6/2713
349/196

(Continued)

FOREIGN PATENT DOCUMENTS

JP 2007-215147 8/2007
JP 2008-166719 7/2008

*Primary Examiner* — Ken N Vanderpuye
*Assistant Examiner* — Dibson Sanchez
(74) *Attorney, Agent, or Firm* — Staas & Halsey LLP

(57) ABSTRACT

An optical transmitter includes a dummy optical source, a polarized wave beam coupler, and an auto gain control (AGC)-system amplifier. The dummy optical source outputs, out of an optical signal in which an optical path signal and an optical packet signal are mixed, a dummy signal having a wavelength identical to that of the optical packet signal. The polarized wave beam coupler multiplexes the dummy signal with the optical signal so that the dummy signal is orthogonal to the optical signal so as to output an output signal. The AGC-system amplifier inputs the output signal, and amplifies the output signal with a predetermined amplification factor corresponding to a power difference between input power and output power of an optical amplifier.

5 Claims, 4 Drawing Sheets

(51) Int. Cl.
*H04Q 11/00* (2006.01)
*H04J 14/06* (2006.01)
*H04B 10/296* (2013.01)

(52) U.S. Cl.
CPC ..... *H04Q 11/0005* (2013.01); *H04Q 11/0066* (2013.01); *H04Q 2011/0016* (2013.01); *H04Q 2011/0083* (2013.01)

(58) Field of Classification Search
USPC .................................................. 398/173–181
See application file for complete search history.

(56) References Cited

U.S. PATENT DOCUMENTS

| | | | | |
|---|---|---|---|---|
| 5,880,866 | A * | 3/1999 | Stolen | H04J 14/08 398/1 |
| 5,923,463 | A * | 7/1999 | Hamada | H01S 3/1301 359/337 |
| 6,064,514 | A * | 5/2000 | Aoki | H01S 3/10007 398/1 |
| 6,078,422 | A * | 6/2000 | Kosaka | H01S 3/1301 398/1 |
| 6,404,540 | B1 * | 6/2002 | Hwang | H01S 3/06754 359/337.1 |
| 6,437,908 | B2 * | 8/2002 | Shiozaki | H04B 10/296 359/337 |
| 6,486,991 | B1 * | 11/2002 | Uehara | H04B 10/296 398/97 |
| 6,606,189 | B2 * | 8/2003 | Akiyama | H04B 10/296 359/337 |
| 6,738,184 | B2 * | 5/2004 | Hayashi | H01S 3/06754 359/341.4 |
| 6,972,895 | B2 * | 12/2005 | Hwang | H01S 3/094003 359/337.11 |
| 7,362,498 | B1 | 4/2008 | Li et al. | |
| 7,397,975 | B2 * | 7/2008 | Okabe | G02F 1/3536 385/11 |
| 7,706,649 | B2 * | 4/2010 | Futami | H04B 10/299 385/11 |
| 7,843,631 | B2 * | 11/2010 | Onaka | H01S 3/1301 359/341.41 |
| 7,844,185 | B2 * | 11/2010 | Park | H04B 10/077 398/175 |
| 8,270,842 | B2 * | 9/2012 | Watanabe | G02F 1/3534 398/152 |
| 2001/0012146 | A1 * | 8/2001 | Shiozaki | H04B 10/296 359/337 |
| 2002/0003650 | A1 * | 1/2002 | Usami | B82Y 20/00 359/248 |
| 2004/0042065 | A1 * | 3/2004 | Nakaji | H01S 3/1301 359/341.41 |
| 2004/0080812 | A1 * | 4/2004 | Sugaya | H04B 10/0775 359/334 |
| 2004/0085621 | A1 * | 5/2004 | Sekiya | H01S 3/302 359/334 |
| 2005/0117915 | A1 * | 6/2005 | Miyazaki | H04B 10/5051 398/188 |
| 2006/0045445 | A1 * | 3/2006 | Watanabe | G02F 1/3515 385/122 |
| 2006/0051100 | A1 * | 3/2006 | Watanabe | H04B 10/07953 398/152 |
| 2007/0230968 | A1 * | 10/2007 | Shimizu | H04B 10/506 398/177 |
| 2008/0069572 | A1 * | 3/2008 | Ikeda | H04B 10/2916 398/158 |
| 2008/0131138 | A1 * | 6/2008 | Futami | G01J 11/00 398/152 |
| 2008/0137179 | A1 * | 6/2008 | Li | H04B 10/296 359/337.13 |
| 2010/0021105 | A1 * | 1/2010 | Watanabe | G02F 1/395 385/11 |
| 2012/0155869 | A1 * | 6/2012 | Sato | H04J 14/0212 398/45 |

* cited by examiner

OPTICAL TRANSMITTER AND OPTICAL TRANSMISSION METHOD

CROSS-REFERENCE TO RELATED APPLICATION

This application is based upon and claims the benefit of priority of the prior Japanese Patent Application No. 2014-146273, filed on Jul. 16, 2014, the entire contents of which are incorporated herein by reference.

FIELD

The embodiment discussed herein is directed to an optical transmitter and an optical transmission method.

BACKGROUND

A wavelength division multiplex (WDM) system has transmitted an optical signal in which an optical path signal between the WDM system and, for example, an optical transport network (OTN) is subjected to optical wavelength division multiplexing. However, in recent years, a flexible operation of a transmission path has been desired in association with the complicated network configuration such as a ring network and a mesh network.

When a transmission path is changed depending on disconnection of the transmission path on a network and the like, the WDM system also increases or decreases the number of signal wavelengths passing through each optical transmitter on the transmission path. In an optical amplifier inside each optical transmitter, an auto gain control (AGC) system is used for promptly coping with a variation in optical power of an optical signal corresponding to a variation in the number of signal wavelengths. The optical amplifier compares input power of an optical signal in an amplifier input stage with output power of the optical signal in an amplifier output stage, and controls an amplification factor to be a predetermined amplification factor corresponding to a power difference resulting from the comparison.

In the WDM system, a technique will be desired for transmitting optical signals in which an optical path signal and an optical packet signal between the WDM system and a local area network (LAN) such as an Ethernet (registered trademark) network is subjected to optical wavelength division multiplexing. In the WDM system, an optical packet signal is generated at user's use timing, in other words, at random, and an optical packet signal exists in a burst manner in an optical signal. In addition, an optical packet signal has a random signal length and signal interval. In an optical transmitter in the WDM system, input power of an optical amplifier greatly varies depending on whether an optical packet signal exists in an optical signal. Related technologies are described in Japanese Laid-open Patent Publication No. 2007-215147 and Japanese Laid-open Patent Publication No. 2008-166719.

It is assumed that input power is stably input to the AGC-system optical amplifier in an optical transmitter for a predetermined period of time. However, the AGC-system optical amplifier has difficulty in ensuring a stable amplification factor since input power greatly varies depending on whether an optical packet signal exists in an optical signal and a power difference thereof greatly varies. When an optical amplifier obtains a monitoring result indicating that an optical packet signal exists in an optical signal in an amplifier input stage and no optical packet signal exists in the optical signal in an amplifier output stage at an identical monitoring timing, a power difference thereof greatly varies and the optical amplifier has difficulty in ensuring a stable amplification factor.

SUMMARY

According to an aspect of the embodiments, an optical transmitter includes an output unit, a multiplexing unit and an amplifier. The output unit outputs, out of an optical signal in which an optical path signal and an optical packet signal are mixed, a dummy signal having a wavelength identical to a wavelength of the optical packet signal. The multiplexing unit multiplexes the dummy signal with the optical signal so that the dummy signal is orthogonal to the optical signal so as to output an output signal. The amplifier inputs the output signal, and amplifies the output signal with a predetermined amplification factor corresponding to a power difference between an input stage and an output stage in the amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A preferred embodiment of an optical transmitter and an optical transmission method according to the present application will be explained in detail with reference to accompanying drawings. It is noted that the embodiment is not intended to limit the scope of the disclosed technique.

Figure 1:
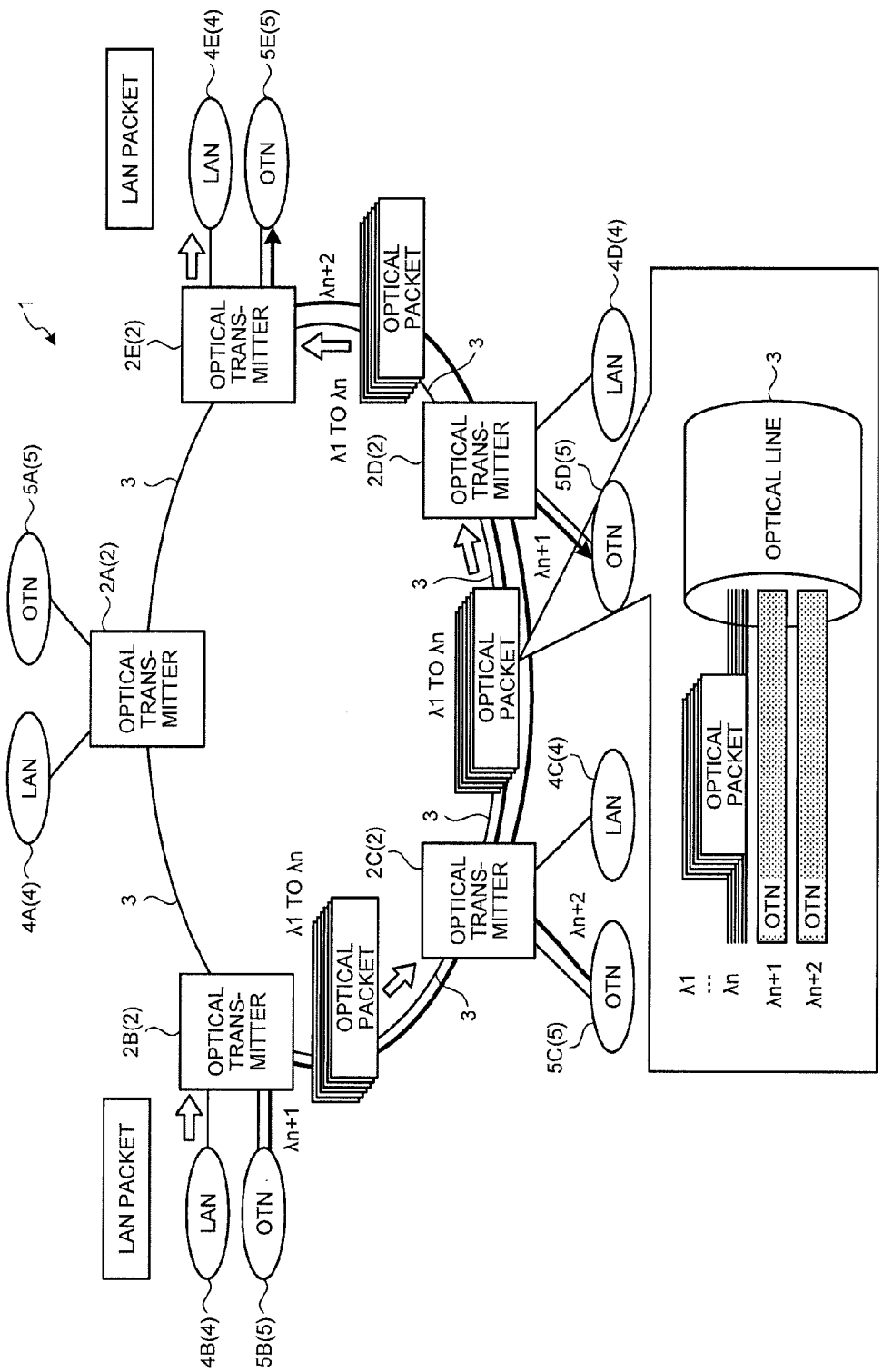
FIG. 1 is an explanatory view illustrating an example of a wavelength division multiplex (WDM) system.

FIG. 1 is an explanatory view illustrating an example of a wavelength division multiplex (WDM) system. A WDM system 1 illustrated in FIG. 1 is configured by connecting a plurality of optical transmitters 2 to each other through a wavelength division multiplex (WDM) line (hereinafter simply referred to as an optical line) 3 and transmitting optical signals subjected to optical wavelength division multiplexing through the optical line 3. The optical transmitters 2 (2A to 2E) are connected to the respective local area networks (LANs) 4 (4A to 4E) and the respective optical transport networks (OTNs) 5 (5A to 5E). The optical transmitters 2 transmit an optical packet signal to the respective LANs 4, for example, and transmit an optical path signal to the respective OTNs 5, for example. An optical path signal is temporally continuous, and an optical packet signal is generated in a burst manner. The optical transmitters 2 transmit optical signals in which an optical packet signal and an optical path signal are subjected to optical wavelength division multiplexing through the optical line 3. An optical signal includes an optical path signal, but may include no optical packet signal depending on user's use timing.

The optical transmitter 2A is connected to, for example, the LAN 4A and the OTN 5A. The optical transmitter 2B is connected to, for example, the LAN 4B and the OTN 5B. The optical transmitter 2C is connected to, for example, the LAN 4C and the OTN 5C. The optical transmitter 2D is connected to, for example, the LAN 4D and the OTN 5D. The optical transmitter 2E is connected to, for example, the LAN 4E and the OTN 5E.

The optical transmitter 2B illustrated in FIG. 1 inputs optical packet signals of wavelengths λ1 to λn addressed from the LAN 4B to the LAN 4E, and inputs an optical path signal of a wavelength λn+1 addressed from the OTN 5B to the OTN 5D. The optical transmitter 2B transmits optical signals in which the input optical packet signals and optical path signal are subjected to optical wavelength division multiplexing to the optical transmitter 2C through the optical line 3. The optical transmitter 2C inputs an optical path signal of a wavelength λn+2 addressed from the OTN 5C to the OTN 5E, inputs the optical signals from the optical transmitter 2B, and transmits an optical signal into which the optical path signal is subjected to optical wavelength division multiplexing to the optical transmitter 2D through the optical line 3.

The optical transmitter 2D inputs the optical signals from the optical transmitter 2C, demultiplexes the optical path signal addressed to the OTN 5D from the optical signals, and transmits the demultiplexed optical path signal to the OTN 5D. The optical transmitter 2D transmits the optical signals from which the optical path signal is demultiplexed to the optical transmitter 2E through the optical line 3. The optical transmitter 2E inputs the optical signals from the optical transmitter 2D, demultiplexes the optical path signal addressed to the OTN 5E and the optical packet signals addressed to the LAN 4E from the optical signals, and transmits the optical path signal addressed to the OTN 5E to the OTN 5E and the optical packet signals addressed to the LAN 4E to the LAN 4E.

Figure 2:
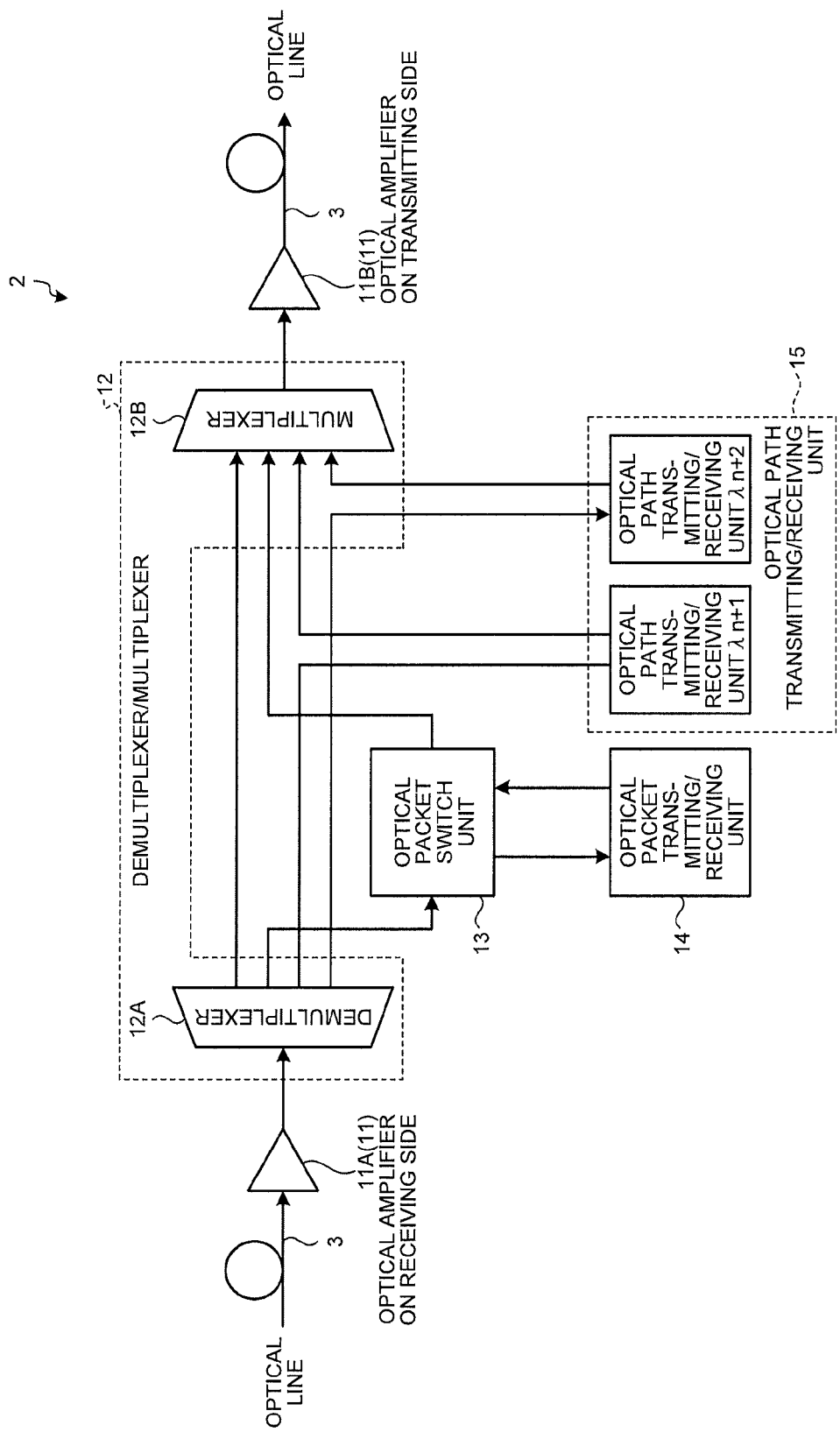
FIG. 2 is an explanatory view illustrating an example of an optical transmitter.

FIG. 2 is an explanatory view illustrating an example of the optical transmitters 2. The optical transmitters 2 illustrated in FIG. 2 includes an optical amplifier 11A (11) on a receiving side, an optical amplifier 11B (11) on a transmitting side, a demultiplexer/multiplexer 12, an optical packet switch unit 13, an optical packet transmitting/receiving unit 14, and optical path transmitting/receiving units 15. The optical amplifier 11A on a receiving side is an AGC-system amplifier that amplifies an optical signal through the optical line 3. The demultiplexer/multiplexer 12 includes a demultiplexer 12A that demultiplexes an optical path signal and an optical packet signal from an optical signal amplified by the optical amplifier 11A on a receiving side, and a multiplexer 12B that multiplexes an optical path signal and an optical packet signal with an optical signal amplified by the optical amplifier 11A on a receiving side.

The optical packet transmitting/receiving unit 14 is connected to, for example, each of the LANs 4, and is a communication unit that transmits/receives an optical packet signal with each of the LANs 4. Each of the optical path transmitting/receiving units 15 is connected to, for example, each of the OTNs 5, and is a communication unit that transmits/receives an optical path signal for each optical wavelength with each of the OTNs 5. The optical packet switch unit 13 switches and connects the demultiplexer/multiplexer 12 with the optical packet transmitting/receiving unit 14. The optical amplifier 11B on a transmitting side is an AGC-system amplifier that amplifies and outputs an optical signal multiplexed by the multiplexer 12B through the optical line 3.

Figure 3:
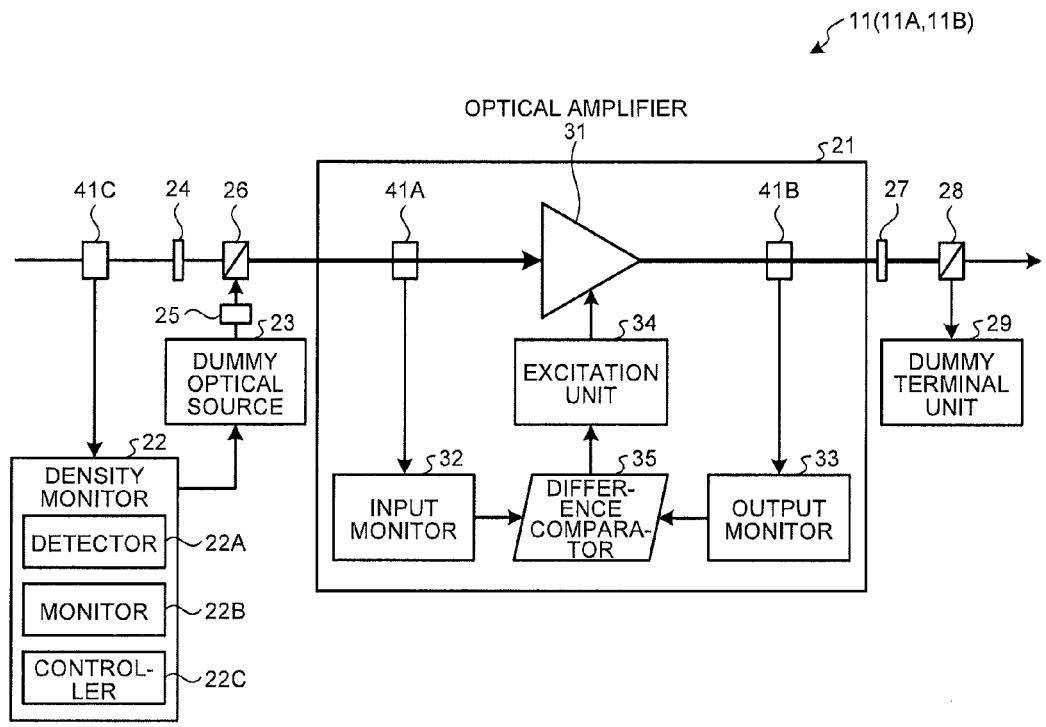
FIG. 3 is an explanatory view illustrating an example of an optical amplifier.

FIG. 3 is an explanatory view illustrating an example of the optical amplifiers 11. The optical amplifier 11 illustrated in FIG. 3 includes an AGC-system amplifying unit 21, a density monitor 22, a dummy optical source 23, a first polarized wave controller 24, a second polarized wave controller 25, and a polarized wave beam coupler 26. In addition, the optical amplifier 11 includes a third polarized wave controller 27, a polarized wave beam splitter 28, and a dummy terminal unit 29.

The AGC-system amplifying unit 21 amplifies an optical signal by the AGC system. The AGC-system amplifying unit 21 includes an optical amplifier 31, an input monitor 32, an output monitor 33, an excitation unit 34, and a difference comparator 35. The optical amplifier 31 corresponds to, for example, a rare-earth doped fiber such as an erbium doped-fiber (EDF) or a semiconductor optical amplifier (SOA), and amplifies and outputs an optical signal. The input monitor 32 converts an optical signal in an input stage of the optical amplifier 31 into an electrical signal using a photodiode (hereinafter simply referred to as a PD) 41A and the like so as to acquire input power. The output monitor 33 converts an optical signal in an output stage of the optical amplifier 31 into an electrical signal using a PD 41B and the like so as to acquire output power.

The difference comparator 35 compares the input power acquired by the input monitor 32 with the output power acquired by the output monitor 33, and calculates a power difference resulting from the comparison. When the optical amplifier 31 is the EDF, the excitation unit 34 corresponds to a laser optical source, and inputs laser light as an excitation signal depending on the power difference to the optical amplifier 31. When the optical amplifier 31 is the SOA, the excitation unit 34 corresponds to a current source or a voltage source, and inputs an electrical signal as an excitation signal depending on the power difference to the optical amplifier 31.

The density monitor 22 includes a detector 22A, a monitor 22B, and a controller 22C. The detector 22A converts an optical signal into an electrical signal using a PD 41C and the like, and measures optical power of the optical signal. The monitor 22B calculates packet density of an optical packet signal to the optical signal based on the measurement result of the optical power and based on the optical power per monitoring time unit. The packet density corresponds to the density of an optical packet signal to an optical signal per unit time. The controller 22C monitors the packet density of the optical packet signal, and controls the dummy optical source 23 depending on the monitoring result.

The dummy optical source 23 emits a dummy signal having a wavelength identical to that of an optical packet signal. The first polarized wave controller 24 is a polarized wave unit that fixes a deflection angle of an optical signal. The second polarized wave controller 25 is a polarized wave unit that adjusts a dummy signal so that a deflection angle is rotated by 90 degrees with respect to an optical packet signal in an optical signal.

The polarized wave beam coupler 26 is located at the front stage of the PD 41A in the input stage of the optical amplifier 31, and multiplexes an optical signal fixed by the first polarized wave controller 24 and a dummy signal adjusted by the second polarized wave controller 25. In addition, the polarized wave beam coupler 26 multiplexes an optical signal and a dummy signal, and outputs an optical signal in which the dummy signal is orthogonal to the optical signal to the optical amplifier 31. The polarized wave beam coupler 26 is a multiplexing unit that makes a deflection angle maintainable.

The polarized wave beam splitter 28 is located at the rear stage of the PD 41B in the output stage of the optical amplifier 31, and splits a dummy signal from an optical signal amplified by the optical amplifier 31. The third polarized wave controller 27 is a polarized wave unit that adjusts an optical signal so that the polarized wave beam splitter 28 splits a dummy signal from the optical signal.

The polarized wave beam splitter 28 splits a dummy signal and an optical signal from the optical signal, and outputs the split dummy signal to the dummy terminal unit 29 and outputs the split optical signal. A deflection angle fixed fiber such as a polarization-maintaining and absorption-reducing (PANDA) fiber is used between the polarized wave beam coupler 26 and the polarized wave beam splitter 28 so that no polarized wave rotates.

Inserting/splitting points are limited to the front and back of the optical amplifier 31 in order to insert a dummy signal into an optical signal in the input stage of the optical amplifier 31 and demultiplex a dummy signal from an optical signal in the output stage of the optical amplifier 31. This manner can prevent a decrease in use efficiency of an optical packet signal due to the dummy signal insertion in the whole WDM system 1.

Figure 4:
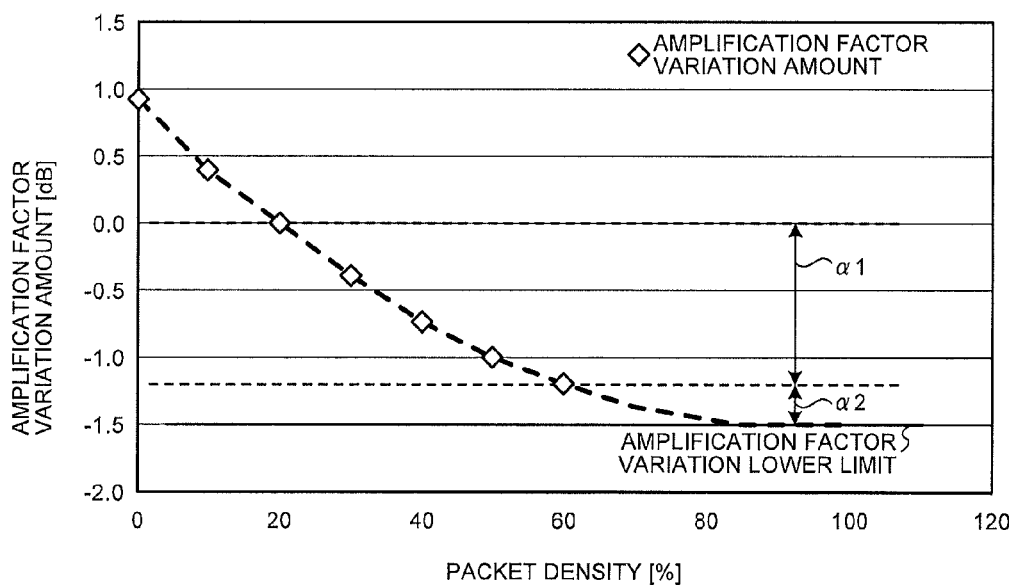
FIG. 4 is an explanatory view illustrating a relation between an amplification factor variation amount of the optical amplifier and packet density of an optical packet signal.

The density monitor 22 controls the dummy optical source 23 depending on the packet density of an optical packet signal. FIG. 4 is an explanatory view illustrating a relation between an amplification factor variation amount of the optical amplifier 31 and the packet density of an optical packet signal. The amplification factor variation amount of the optical amplifier 31 has such a characteristic that the amplification factor variation amount is larger while the packet density of an optical packet signal is shifted from 0% to 60% and becomes smaller when the packet density exceeds 60%. An amplification factor variation amount α1 while the packet density is shifted from 20% to 60% is approximately 1.2 dB. Furthermore, an amplification factor variation amount α2 while the packet density is shifted from 60% to 100% is smaller as compared with the amplification factor variation amount α1.

The monitor 22B in the density monitor 22 determines whether the packet density of an optical packet signal exceeds a predetermined threshold, for example, 60%. When the packet density of an optical packet signal does not exceed 60%, the controller 22C in the density monitor 22 controls the dummy optical source 23 to output a dummy signal. When the packet density of an optical packet signal exceeds 60%, the controller 22C controls the dummy optical source 23 to stop outputting a dummy signal.

The density monitor 22 can set target density other than a predetermined threshold. The target density is properly changeable depending on the setting operation of a user. The monitor 22B determines whether the packet density of an optical packet signal exceeds the target density. When the packet density exceeds the target density, even when the packet density of an optical packet signal is less than 60%, the controller 22C controls the dummy optical source 23 so as to stop outputting a dummy signal.

Figure 5:
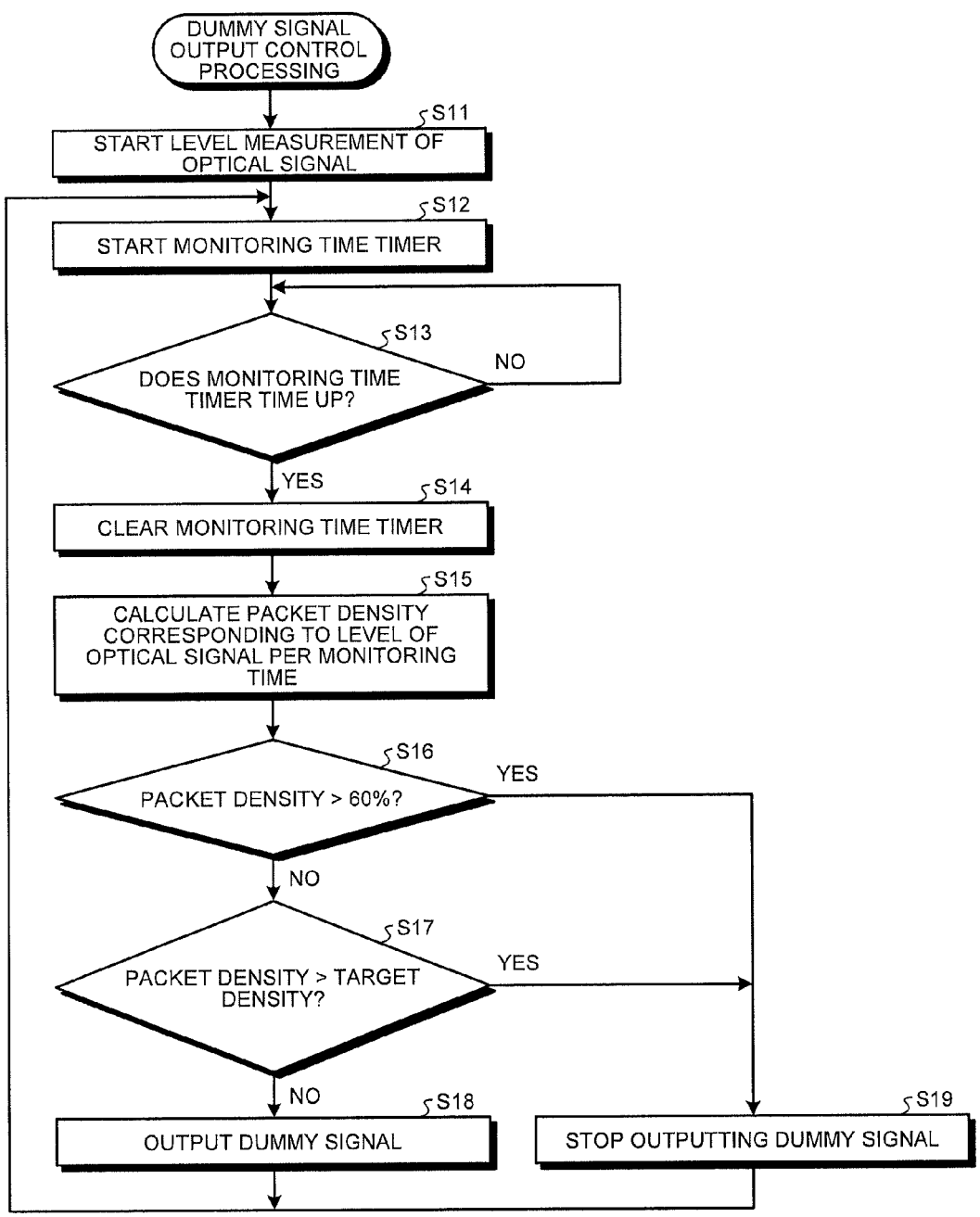
FIG. 5 is a flowchart illustrating an example of processing operation inside the optical amplifier related to dummy signal output control processing.

A description will be made of operation of the WDM system 1 according to the embodiment. FIG. 5 is a flowchart illustrating an example of processing operation of the optical amplifiers 11 related to dummy signal output control processing. The dummy signal output control processing illustrated in FIG. 5 is processing for controlling output of a dummy signal depending on the packet density per monitoring time. The density monitor 22 preliminarily sets, for example, a monitoring time and the target density.

In FIG. 5, the detector 22A in the density monitor 22 starts level measurement of an optical signal through the optical line 3 (Step S11), and starts a monitoring time timer (Step S12). The monitoring time timer is a timer that clocks a monitoring time.

The detector 22A determines whether the monitoring time timer times up (Step S13). When the monitoring time timer times up (Yes at Step S13), the detector 22A clears the monitoring time timer (Step S14). The monitor 22B in the density monitor 22 calculates the packet density of an optical packet signal based on the result of measuring a level of an optical signal per monitoring time (Step S15).

The monitor 22B determines whether the packet density exceeds 60% serving as a predetermined threshold (Step S16). The predetermined threshold corresponds to a threshold of the packet density in which the amplification factor variation amount of the optical amplifier 31 decreases, for example, 60%. When the packet density does not exceed the predetermined threshold 60% (No at Step S16), the monitor 22B determines whether the packet density exceeds the target density (Step S17). The target density can be set depending on the setting operation of a user.

When the packet density does not exceed the target density (No at Step S17), the controller 22C in the density monitor 22 controls the dummy optical source 23 so as to output a dummy signal (Step S18), and performs the processing at Step S12 so as to start the monitoring time timer. In this case, an output signal in which an optical signal and a dummy signal are multiplexed is input to the input stage of the optical amplifier 31 so that the dummy signal is orthogonal to the optical signal. In this manner, the optical amplifiers 11 can ensure a stable amplification factor by reducing a variation in input power of the optical amplifier 31 and making the amplification factor variation amount of the optical amplifier 31 small.

When the monitoring time timer does not time up (No at Step S13), the monitor 22B performs the processing at Step S13 in order to monitor whether the monitoring time timer times up. When the packet density exceeds the predetermined threshold 60% (Yes at Step S16), the controller 22C controls the dummy optical source 23 so as to stop outputting a dummy signal (Step S19), and performs the processing at Step S12 so as to start the monitoring time timer. In this case, an optical signal is input to the input stage of the optical amplifier 31 without multiplexing a dummy signal. In this manner, the optical amplifiers 11 can secure a stable amplification factor since the packet density of an optical packet signal exceeds 60% and the amplification factor variation amount of the optical amplifier 31 becomes small without multiplexing a dummy signal.

When the packet density exceeds the target density (Yes at Step S17), the controller 22C performs the processing at Step S19 in order to stop outputting a dummy signal.

In FIG. 5, the density monitor 22 controls the dummy optical source 23 depending on the packet density per monitoring time. When the packet density does not exceed 60%, the density monitor 22 controls the dummy optical source 23 so as to output a dummy signal. The density monitor 22 inputs an optical signal in which an optical signal and a dummy signal are multiplexed to the optical amplifier 31 so that the dummy signal is orthogonal to the optical signal. In this manner, the optical amplifiers 11 can ensure a stable amplification factor by reducing a variation in input power of the optical amplifier 31 and making the amplification factor variation amount of the optical amplifier 31 small.

When the packet density exceeds 60%, the density monitor 22 controls the dummy optical source 23 so as to stop outputting a dummy signal. In this manner, the optical amplifiers 11 can secure a stable amplification factor since the amplification factor variation amount of the optical amplifier 31 becomes small without multiplexing a dummy signal.

When the packet density exceeds the target density set by a user, even when the packet density is less than 60%, the density monitor 22 controls the dummy optical source 23 so as to stop outputting a dummy signal. In this manner, the optical amplifiers 11 can stop outputting a dummy signal depending on the setting of a user even when the packet density is less than 60%.

In the embodiment, the polarized wave beam coupler 26 is located at the front stage of each of the optical amplifiers 11, and multiplexes a dummy signal with an optical signal so that the dummy signal is orthogonal to an optical packet signal in the optical signal so as to input the multiplexed signal to the optical amplifier 31. The optical amplifiers 11 can ensure a stable amplification factor by reducing a power variation in an optical packet signal and making the amplification factor variation amount of the optical amplifier 31 smaller. The optical amplifiers 11 can reduce degradation of an optical packet signal and an optical path signal to ensure a high-accurate optical transmission method. In addition, occurrence of an oscillation phenomenon and a resonance phenomenon can be prevented in association with stabilization of the amplification factor of the optical amplifiers 11.

Furthermore, in the embodiment, degradation of an optical signal due to the dummy signal insertion can be reduced by completely demultiplexing a dummy signal from an optical signal using the polarized wave beam splitter 28 in the output stage of each of the optical amplifiers 11.

In the embodiment, inserting/demultiplexing points of a dummy signal are limited to the front and back of the optical amplifier 31 in order to insert a dummy signal into an optical signal in the input stage of the optical amplifier 31 and demultiplex a dummy signal from an optical signal in the output stage of the optical amplifier 31. This manner can prevent a decrease in use efficiency of an optical packet signal due to the dummy signal insertion in the whole WDM system 1.

In the embodiment, a dummy signal is multiplexed with an optical signal so that a deflection angle of the dummy signal is orthogonal to the optical signal so as to output the multiplexed optical signal. Thus, an optical signal is input to the optical amplifier 31, and the input optical signal is amplified with an amplification factor corresponding to a power difference between input power and output power of the optical signal. In this manner, the optical amplifiers 11 can ensure a stable amplification factor by reducing a variation in input power of the optical signal.

The density monitor 22 in the embodiment detects optical power of an optical signal, monitors the packet density of an optical packet signal to the optical signal based on a detection result of the optical power, and controls the dummy optical source 23 depending on the packet density. The density monitor 22 can control input and output of a dummy signal by stopping output of the dummy signal when the packet density exceeds 60% and outputting the dummy signal when the packet density is less than 60%. In this manner, a stable amplification factor can be ensured by reducing a variation in input power of an optical signal.

In the embodiment, the first polarized wave controller 24 fixes a deflection angle of an optical signal, and the second polarized wave controller 25 rotates a deflection angle of a dummy signal by 90 degrees with respect to the optical signal and multiplexes the dummy signal with the optical signal so as to acquire an output signal in which the dummy signal is orthogonal to the optical signal.

In the embodiment, the density monitor 22 monitors the packet density and controls the dummy optical source 23 depending on the packet density, but the density monitor 22 may control the dummy optical source 23 depending on whether an optical packet signal exists in an optical signal.

In the embodiment, when the packet density exceeds 60%, outputting a dummy signal is stopped, but a dummy signal may be output when an optical packet signal exists under the condition that the packet density exceeds 60% without monitoring the packet density.

The embodiment exemplifies the optical transmitters 2 of the WDM system 1 in which input power of the optical amplifiers 11 varies because an optical packet signal in an optical signal of the WDM system 1 exists in a burst manner, but this is not limited to the optical packet signal and is applicable to other systems.

In the embodiment, a predetermined threshold of the packet density is 60%, but this is not limited to 60% and is properly changeable.

The components of each of the illustrated units are not necessarily configured physically as illustrated. In other words, specific states of distributing or integrating each of the units are not limited to the illustrated states, and all of or a part of the units can be configured to be functionally or physically distributed or integrated in a desired unit depending on various kinds of loads and use situations.

All of or any part of the processing functions executed by each of the apparatuses may be executed on a central processing unit (CPU) (or microcomputers such as a micro processing unit (MPU) and a micro controller unit (MCU)). It goes without saying that all of or any part of the processing functions may be executed on a computer program analyzed and performed by the CPU (or microcomputers such as the MPU and the MCU), or on hardware based on the wired logic.

An aspect of an embodiment of the invention enables a stable amplification factor to be ensured even when an optical path signal and an optical packet signal are mixed.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmitter comprising:
a source that outputs, out of an optical signal in which an optical path signal and an optical packet signal are mixed, a dummy signal having a wavelength identical to a wavelength of the optical packet signal;
a multiplexer that multiplexes the dummy signal with the optical signal so that the dummy signal is orthogonal to the optical signal so as to output an output signal;

an amplifier that inputs the output signal, and amplifies the output signal with a predetermined amplification factor corresponding to a power difference between an input stage and an output stage in the amplifier; and a processor configured to detect optical power of the optical signal, monitor density of the optical packet signal to the optical signal based on the detection result of the optical power, and control the output of the dummy signal corresponding to the density of the optical packet signal.

2. The optical transmitter according to claim 1, further comprising a demultiplexer that demultiplexes the dummy signal from the amplified output signal.

3. The optical transmitter according to claim 1, wherein the processor is further configured to control the source to stop outputting the dummy signal when the density of the optical packet exceeds a predetermined threshold, and control the source when the density of the optical packet does not exceed the predetermined threshold.

4. The optical transmitter according to claim 1, further comprising:

a first polarizer that fixes a deflection angle of the optical signal; and a second polarizer that rotates a deflection angle of the dummy signal by 90 degrees with respect to the optical signal, wherein the multiplexer multiplexes the fixed optical signal and the rotated dummy signal so as to output the output signal.

5. An optical transmission method performed by an optical transmitter, the optical transmission method comprising:

outputting, out of an optical signal in which an optical path signal and an optical packet signal are mixed, a dummy signal having a wavelength identical to a wavelength of the optical packet signal by a source of the optical transmitter;

multiplexing, by a multiplexer of the optical transmitter, the dummy signal with the optical signal so that the dummy signal is orthogonal to the optical signal so as to output an output signal to an amplifier of the optical transmitter;

amplifying, by the amplifier, the output signal with a predetermined amplification factor corresponding to a power difference between an input stage and an output stage of the output signal in the amplifier;

detecting, by a processor of the optical transmitter, optical power of the optical signal;

monitoring, by the processor, density of the optical packet signal to the optical signal based on the detection result of the optical power; and controlling, by the processor, the output of the dummy signal corresponding to the density of the optical packet signal.

* * * * *